United States Patent [19]

Ongaro

[11] 4,016,020
[45] Apr. 5, 1977

[54] SYSTEM FOR MEASURING AND CORRECTING VIBRATIONS GENERATED IN VEHICULAR TIRES

[75] Inventor: Theodore Ongaro, Columbus, Ohio

[73] Assignee: Ongaro Dynamics Incorporated, Columbus, Ohio

[22] Filed: Oct. 20, 1975

[21] Appl. No.: 623,639

Related U.S. Application Data

[63] Continuation-in-part of Ser. No. 402,899, Oct. 3, 1973, abandoned.

[52] U.S. Cl. .......................... 156/75; 51/DIG. 33; 51/106 R; 156/154; 157/13; 301/5 BA
[51] Int. Cl.² .................. B32B 35/00; G01M 1/00
[58] Field of Search ............... 156/75, 110, 123, 153, 156/154, 360, 394, 378; 73/66, 458, 459, 460, 462, 468–470, 146; 301/5 B, 5 BA; 51/106 R, 281 R, 165 R, 165.9, DIG. 33; 157/13

[56] References Cited

UNITED STATES PATENTS

| | | | |
|---|---|---|---|
| 2,080,227 | 5/1937 | Periat et al. | 156/75 |
| 3,048,211 | 8/1962 | Cuthbertson et al. | 156/123 |
| 3,352,732 | 11/1967 | Darr | 156/75 |
| 3,412,615 | 11/1968 | Nedley | 73/146 |
| 3,491,493 | 1/1970 | Deist | 157/13 |
| 3,574,973 | 4/1971 | Rader | 157/13 |
| 3,724,137 | 4/1973 | Hofelt et al. | 156/64 |
| 3,780,573 | 12/1973 | Reus | 73/146 |
| 3,841,033 | 10/1974 | Appleby et al. | 51/106 R |
| 3,849,942 | 11/1974 | Monajjem | 51/106 R |
| 3,862,570 | 1/1975 | Ongaro | 73/146 |

OTHER PUBLICATIONS

*Tire Technology* by F. J. Kovac, Goodyear Tire & Rubber Co., 1973, pp. 92–93.

Primary Examiner—Charles E. Van Horn
Assistant Examiner—John E. Kittle
Attorney, Agent, or Firm—Melville, Strasser, Foster & Hoffman

[57] ABSTRACT

An integrated system for eliminating the vibrations generated in vehicular tires under cruising speed conditions by correcting the tire both for peripheral non-uniformities and for lack of symmetry. The system includes means for revolving the tire being corrected under conditions simulating the weight load placed on the tire in actual use as well as the centrifugal forces encountered when operated at a cruising speed of from 50 to 90 miles per hour, together with means for measuring both the magnitude and location of the forces generated by peripheral non-uniformities developed in the tire and also the magnitude and location of the forces generated by lack of tire symmetry. The measuring means generate signals which are fed to a digital computer which governs the correction of the tire in a two stage corrective procedure, the first stage comprising the honing of the outside periphery of the tire while it is being revolved at cruising speed at the proper locations and in sufficient amounts to effectively remove the non-uniform areas which are developed in the tire. Concurrently the measuring means also determines and feeds to the computer signals indicating the location and amounts of weight necessary to counterbalance the forces generated by lack of symmetry in the tire once it has been corrected for the peripheral non-uniformities.

19 Claims, 4 Drawing Figures

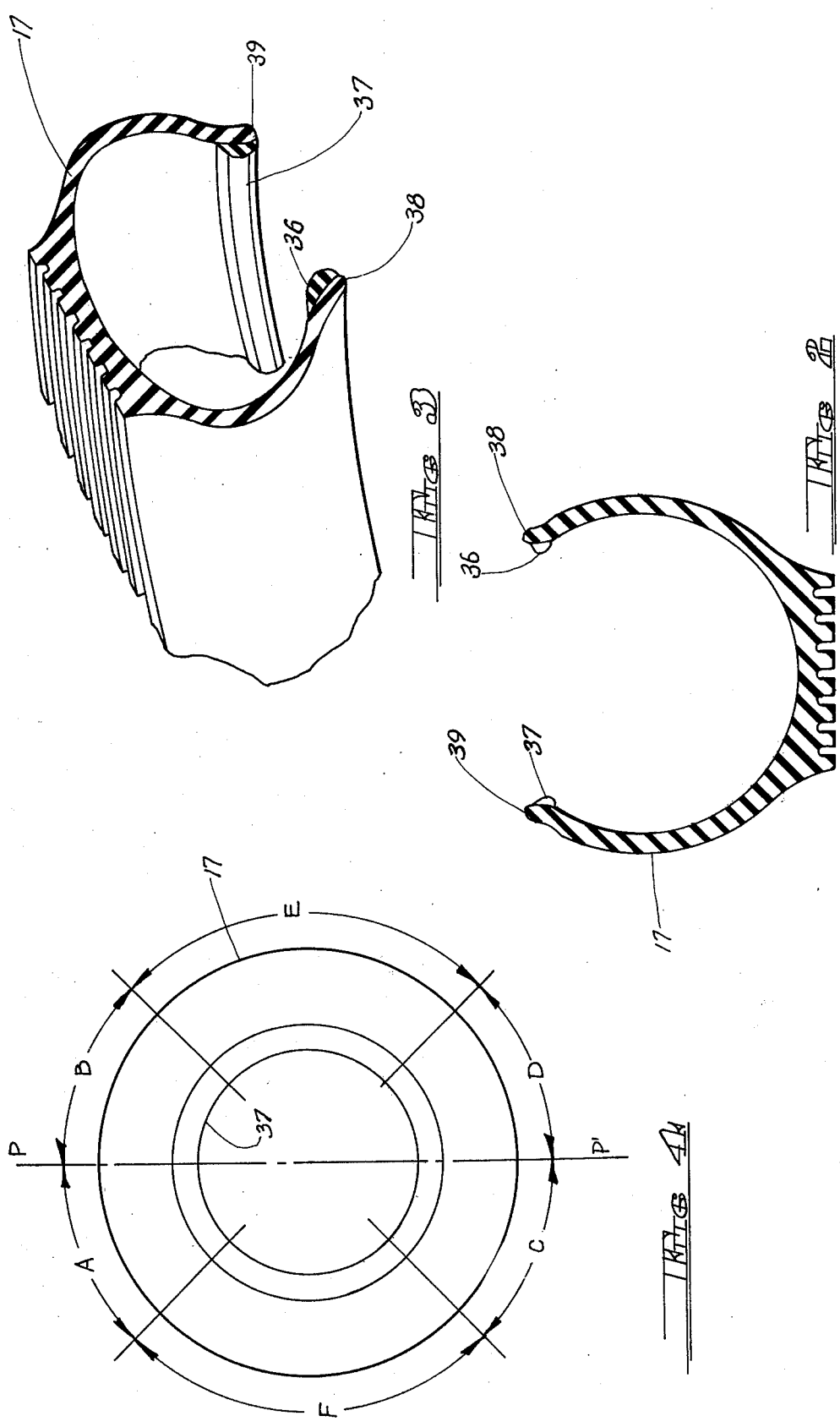

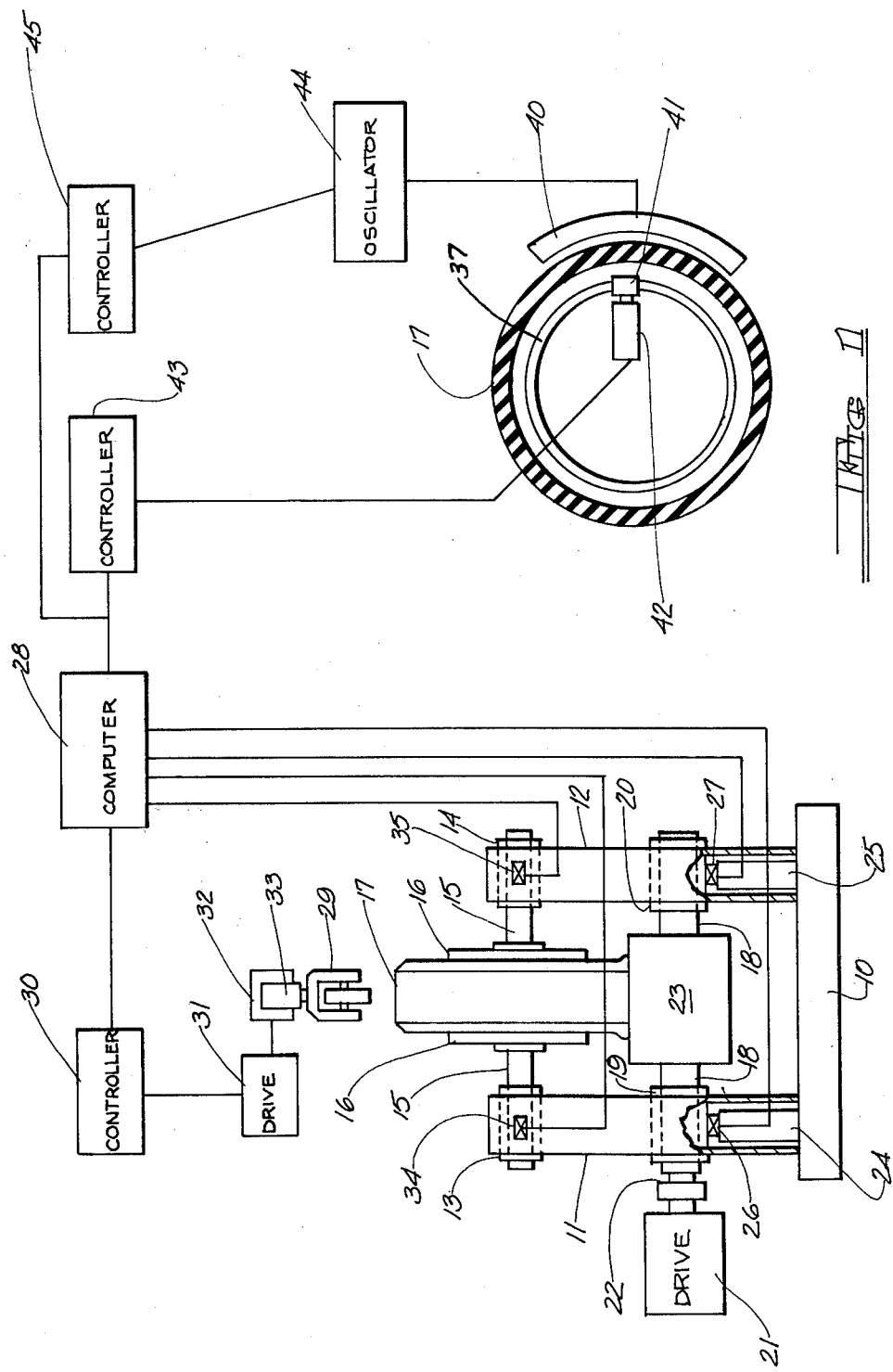

SYSTEM FOR MEASURING AND CORRECTING VIBRATIONS GENERATED IN VEHICULAR TIRES

This is a continuation-in-part of copending application Ser. No. 402,899, filed Oct. 3, 1973 now abandoned, abandoned in favor of this application.

BACKGROUND OF THE INVENTION

The methods and systems utilized by the prior art to eliminate the vibrations generated in vehicular tires are basically modifications of balancing devices utilized in industry to balance industrial components, such as rotors, for the elimination of vibrations. The terms "balance" and "unbalance" are popularly used to indicate whether or not the part is free from vibration as it is rotated. In this context, the term "balance" denotes a condition wherein the rotor or the like is rotating about its principal axis and coincident with its supporting bearing.

In the case of a rotor, irrespective of its configuration, the unbalancing forces always occur once per revolution, which is the fundamental frequency of the rotating rotor. In the case of long flexible rotors, balancing is performed in multiple planes along the axis of the rotor. In all cases, however, the rotor, once balanced, has its principal axis of rotation rotating in coincidence with its bearings. Balancing can be readily accomplished since a rotor is effectively a homogenous, non-flexible mass, and it is always supported in bearings while freely rotating in space, whether during balancing or in actual use.

A rubber tire, on the other hand, although it is intended to be geometrically round, is not round when in use since it does not freely rotate in space. Rather, a tire must support a portion at least of the weight load of the vehicle, and while supporting the load radially, the tire is vertically in contact with the road. Unlike a rotor, which is effectively a solid mass, a tire is flexible and expands and contracts in use. The radius of a tire in the area of vertical contact with the road is always smaller than its radius at any other angle about the tire due to the load it carries. The area in contact with the road is known as the "tire patch" and it is the area which is vertically loaded (referred to as the "loaded radius"), the tire being deflected inwardly from ¼ – ½ inch in the patch area under normal load and tire inflation. Consequently, as the tire revolves about the vehicle's wheel axle and bearings, which the tire also supports, the physical geometric center of the tire is never coincident with its principle bearing axis due to its constantly changing supporting radius. This condition creates a constantly changing dynamic disturbance which is directly related to the velocity (revolutions per minute) of the tire.

As a tire revolves, centrifugal forces are generated which increases dramatically with increases in velocity; and as the centrifugal forces increase, the tire tread gradually expands radially outwardly — literally it grows — and it also hardens due to the centrifugal outward forces acting on the tread rubber as well as on the fabrics or other reinforcement incorporated in the tire tread. As the tire tread diameter grows, its over-all structure stiffens and the size of the tire patch is reduced, along with a reduction in sidewall bulginess, resulting in an increase in the loaded radius of the tire which acts to raise the vehicle. In addition, there are many variables which enter into tire construction, including variations caused by the various splices in the tire; variations in the materials from which the tire is constructed, including variations in their composition; dimensional irregularities and inaccuracies both in the tire building equipment and in curing; and, of course, human error. The net result is the generation of a complexity of ramdomly distributed vibration producing forces which are transmitted to the vehicle through its wheel hubs and axles. These vibrations producing forces manifest themselves as non-circular areas (non-uniformities) extending around the periphery of the tire. These non-uniformities vary in both location and magnitude depending upon velocity, the velocity of particular concern being the cruising speed at which the vehicle normally will be operated. At crusing speeds the resiliency of the tire is greatly reduced, which amplifies the stiffness of the non-circular area as they roll along the road. Since the size of the tire patch is also reduced, the unit load is greater, which magnifies the reaction between the non-uniformities and the road surface. This reaction results in a rapidly changing loaded radius which generates a complex up and down movement of the wheel hub and axle for each revolution of the tire as the non-uniformities come into contact with the road surface, and these movements are transmitted as vibrations to the vehicle.

Although the terms "balance" and "unbalance" also have been extensively used in the tire manufacturing and correction art, the terms are misleading and generally apply only to a small spectrum of the vibration producing forces, usually being confined to the forces produced by lack of tire symmetry which occur only once per revolution of the tire and are variable in magnitude, depending upon velocity. It may be flatly stated that all tires leaving the tire manufacturer's plant are in an over-all self-exciting condition, that is, they are not free from vibration when in use. Even though various "balancing" steps may be performed by the automobile manufacturer or by the seller or user of the tires which may improve their balance, the corrected tires are not free from vibration causing forces which are centrifugally generated either at the fundamental frequency or at frequencies of higher order. While certain prior art processes have included the honing of the outside periphery (tread) of the tire to improve its roundness and concentricity, the areas of the tread to be honed are determined under essentially static conditions, usually without loading to simulate the weight load placed on the tire in use. Even in prior art systems wherein the tire is loaded and revolved at speeds of approximately one to five miles per hour, the physical eccentricity, if any, generated in the tire at these low speeds is quite different from the centrifugally generated eccentricity encountered when the tire is revolved under true environmental-like conditions, i.e., under load and at cruising speed. Suffice to say that the prior art, while recognizing the existence of lateral and radial force variations when a tire is revolved in space and the desirability of compensating for these variations, has totally failed to understand the true nature of the centrifugally developed forces and their effect on tire performance, much less how to effectively correct the tire to reduce these forces to an acceptable low level. The centrifugal forces developed in a tire at relatively slow speeds, such as 50 or even 100 revolutions per minute, are normally neglible and have no real effect on either tire non-uniformity or dynamic unbalance. The vibration producing forces which cause the real problem are those which occur at relatively high speeds, normally crusing speed, and it is these forces which have been wholly neglected by the prior art.

Prior art systems are known wherein "balancing" is effected by adding weights to the wheel rim, or by adding counterbalancing weights to the tire itself. Some add the weights to the inside and others to the outside of the tire. In one system the weight is added internally to the entire crown of the tire and then removed as required. In all instances, however, the correction attempted is not dictated by realistic changes in tire configuration caused by high angular centrifugal forces; rather, it is dictated by forces encountered when the tire is in a static or near-static condition. It may be additionally noted that where the weight is added internally to the crown of a tire, the performance characteristics of the tire are altered. As in the case where material is honed from the periphery of the tire when in a static or near-static condition, the location and amplitude of the generated forces will change with changes in velocity; consequently the addition or substraction of material from the crown of the tire may worsen rather than improve vibration when the tire is operated at cruising speed.

In order to correct the tire both for peripheral non-uniformities and for lack of symmetry, it is essential to locate and measure, as well as segregate, the vibration producing forces. To this end, the present invention utilizes the measuring system disclosed in co-pending U.S. Pat. No. 3,862,570, dated Jan. 28, 1975, in the name of the present inventor. In accordance with the teachings of this patent, both the dynamic unsymmetrical forces and the centrifugally generated forces which are the result of radially loaded peripheral non-uniformities are simultaneously measured and recorded so that the appropriate corrective measures may be taken.

SUMMARY OF THE INVENTION

The present invention relates to a system and procedures for correcting tires for both lack of symmetry and vibrations created by dynamic non-uniformities which are centrifugally developed in the tire when under load and at cruising speed.

The measuring system of the aforementioned U.S. Pat. No. 3,862,570 is utilized to determine under simulated load and cruising speed conditions simultaneously and independently both the magnitude and location of all the generated vibration producing forces. The dynamic unsymmetrical forces, whether radical or lateral, create a fundamental frequency signal once per revolution of the tire irrespective of its velocity, whereas the signals which are the result of centrifugally amplified peripheral non-uniformities vary in frequency and distribution about the periphery of the tire in accordance with its velocity. Two sets of sensors are utilized to measure the generated forces, the first set being positioned to measure and locate peripheral non-uniformities, with the second set positioned to measure and locate unsymmetrical forces on opposite sides of the tire. All of the generated force signals are fed to an all purpose digital computer where they are recorded and stored. The computer, in turn, controls the action of correcting mechanism which acts on the tire in accordance with the recorded data.

The tire is corrected in two stages, the first stage comprising the honing of the outside periphery of the tire by means of one or more honing or grinding devices which remove rubber from the tread of the tire in the amounts and at the places to reduce the centrifugally generated non-uniformities to an acceptable low level, preferably to a level where the generated forces are effectively zero.

After the tire has been first corrected to reduce or eliminate its centrifugally operated non-uniformities, it is then subjected to a second stage corrective step during which weights are effectively added to the opposite sides of the tire at the places and in the amounts necessary to counterbalance the dynamics unbalance forces detected and located by the measuring system. Preferably this is accomplished by bonding a pair of annular rubber rings to the insides of the tire beads prior to testing — usually as an incident of the manufacture of the tire — and in the second stage corrective procedure portions of these rubber rings are removed except in those locations and in those amounts necessary to counterbalance the tire so that it will be symmetrical (dynamically in balance) when operated at cruising speed. The removal of the designated portions of the rubber rings is accomplished by a second stage honing or grinding device which coacts with an oscillating tire cradle, the cradle serving to bring the designated areas of the rings into contact with the honing device. The portions of the rubber rings which remain after the second stage honing operation are those necessary to dynamically counterbalance the tire to eliminate both radial and lateral vibrations resulting from lack of symmetry. The second stage honing device, together with the oscillating tire cradle, are controlled by the computer in accordance with the stored signals indicative of the lack of symmetry. Alternatively, the signals indicating the location and magnitude of unsymmetrical forces may be utilized for the addition of counterbalancing amounts of weight at the proper locations about the inner surfaces of the tire beads or adjoining sidewall areas of the tire, as by the bonding of strips or patches of rubber material of the required weight and length to the tire at the proper locations.

OBJECTS OF THE INVENTION

It is a principal object of the present invention to provide a new tire vibration correcting procedure which eliminates all types of vibrations in a tire as encountered in use at highway cruising speeds.

It is another object of the present invention to provide a new tire correcting procedure which insures a uniform supporting radius (loaded radius) maintained by the axis of rotation of the tire in relation to the tire patch at cruising speeds.

It is another object of the present invention to provide a new tire correcting procedure which insures a uniform supporting radius (loaded radius) maintained by the axis of rotation of the tire in relation to the tire patch at cruising speeds.

It is another object of the present invention to provide a new tire vibration correcting procedure wherein a counterbalancing material, preferably rubber, is added to, or substracted from, the inner surface of the sidewalls of the tire itself at or immmediately adjacent the tire beads.

A further object of the present invention is to provide a new tire vibration correcting system which utilizes the measuring system of the aforementioned U.S. Pat. No. 3,862,570 and includes correction of the tire both for centrifugally generated non-uniformities and for lack of symmetry as determined and measured by the said measuring system.

Still another object of the present invention is to correct the tire in a two stage corrective procedure, the first stage comprising the honing of the periphery of the tire at cruising speeds to effectively eliminate centrifugally generated non-uniformities, with the second stage procedure comprising the effective addition of weights to the inside of the side walls in a manner to counterbalance the tire for lack of symmetry without in any way adversely affecting the performance characteristic of the tires previously corrected outer periphery.

Further objects and features of the present invention will become apparent from the following detailed description when taken in conjunction with the accompanying drawings.

DESCRIPTION OF THE DRAWINGS

FIG. 1 is a schematic diagram illustrating the preferred embodiment of the present invention.

FIG. 2 illustrates in cross-section a typical tire with counterbalancing rubber rings secured to the inside of the tire beads.

FIG. 3 is a fragmentary perspective view of the tire shown in FIG. 2.

FIG. 4 is a diagrammatic elevational view of a tire in cross-section illustrating the oscillation of the tire to effect honing of the rubber balancing rings.

DESCRIPTION OF THE PREFERRED EMBODIMENTS

Referring first to FIG. 1 of the drawings, the system and procedures of the present invention comprise the provision of a supporting base 10 having a pair of rigid upstanding frame members 11 and 12 which support pillow blocks 13 and 14 in which the axle 15 is rotatably journaled. A test wheel 16 is secured to the axle and the tire 17 to be corrected is mounted on the test wheel and inflated to normal pressure. A shaft 18 rotatably journaled in pillow blocks 19 and 20 is also supported by the frame members 11 and 12, the shaft 18 being driven by drive means 21 through a suitable flexible coupling 22, which may comprise a universal joint. The shaft 18 drives a road-simulating drum 23 positioned to contact and drive the tire 17.

Lifting means 24 and 25, which may comprise twin screw means, or hydraulic or pneumatic lifters, adapted to be raised or lowered in unison, act through pillow blocks 19, 20 and drive shaft 18 to cause the drum 23 to bear against the tire 17 to simulate the weight load which will be borne by the tire under normal conditions of use. To this end, the axles 15 and 18 lie in parallel relation to each other and in a common vertical plane. In addition, the drive means 21 will be of sufficient capacity to revolve the drum 23 and hence the tire 17 at cruising speeds equivalent to from 50-90 miles per hour under load.

Sensors 26 and 27 are mounted between pillow blocks 19 and 20 and their underlying lifters 24 and 25, respectively. The sensors 26 and 27 thus lie beneath the axle 18 in a vertical plane passing through its axis of rotation where they serve to measure the dynamic centrifugal forces generated by the tire which are indicative of peripheral non-uniformities uneffected by forces resulting from dynamic unbalance. The sensors 26 and 27 will preferably comprise piezoelectric quartz crystals capable of withstanding extreme forces without fracturing. It may be pointed out that in the application of load to the tire being corrected through the lifters 24 and 25, a monetary force is applied to the sensors 26 and 27, but the sensors will immediately return to a zero reading position once the load is applied and fixed, and thereafter the sensors will react only to the dynamic forces generated by non-uniformities developed in the portion of the tire in contact with the drum. As the tire revolves, the sensors 26 and 27 continuously measure the forces generated by peripheral non-uniformities throughout the full width of the tread and throughout the full 360° circumference of the tire. The sensors 26 and 27 generate force signals indicative of the magnitude and location of the generated forces and these signals are fed to the computer 28.

The computer 28 is an all-purpose digital computer programmed to determine the areas on the tire where the vibration producing forces appear as well as the amount of rubber which must be removed from the outside periphery of the tire to reduce the force generating non-uniformities to at least an acceptable low level.

The honing of the periphery of the tire is accomplished by the honing device 29, which may comprise a tire grinding disc of known construction. The computer 28, acting through controller 30 and drive means 31, controls a movable carriage 32 to initially position the honing device 29 in close proximity to the periphery of the tire but free from contact with its highest non-uniformity. In practice, the honing device 29 will be moved to a position in which it lies approximately 0.020 from the point of highest growth by means of the carriage 32. The controller 30 further serves to actuate a valve 33 mounted on the carriage 32 and operatively connected to the honing device 29, the valve having a jet-like movement effective to move the honing device into and out of honing engagement with the tire 17.

The recorded information concerning the location and magnitude of the non-uniformities is converted by the computer 28 to corrective signals which are fed to the controller 30, and the controller momentarily activates the valve 33 to force the honing device into engagement with the tire at the precise location of the non-uniformity being corrected, such engagement being repeated for as many revolutions of the tire as required to effectively remove the non-uniformity. It will be understood that where multiple non-uniformities are encountered, a separate honing operation will be performed for each non-uniformity. While in the embodiment illustrated in FIG. 1 only a single honing device 29 has been illustrated, it will be understood that a plurality of honing devices may be provided at spaced intervals relative to the periphery and the tread width of the tire so that multiple honing operations may be simultaneously performed on different areas of the tire during each honing cycle.

It may be noted that there are currently no uniform standards for tire acceptability. Standards vary from manufacturer to manufacturer and are constantly changing. A typical concentricity limit of acceptability is 0.040 at the unrealistic road speed of one to five miles per hour. In other words, by current commercial standards, a tire is deemed acceptable if its peripheral eccentricities do not exceed 0.040 under near static conditions. It also may be noted that a eccentricity on a tire of 0.001 when rotated at 60 miles per hour will generate a force of 1.4 lbs., which means that an eccentricity of 0.040 will generate a vibration producing force of 64 lbs. When it is further considered that a peripheral eccentricity in a tire of 0.040 when operated at 1 to 5 miles per hour may be substantially magnified at 60 miles per hour, the magnitude of vibration producing forces inherent in currently available "balanced" tires becomes readily apparent. It should be made clear however, that there is no direct correlation between the lack of concentricity of the first order encountered at low speeds as opposed to centrifugally generated non-uniformites encountered at high speeds; they are not necessarily at the same locations or of the same magnitude, and they may either increase or decrease in magnitude in accordance with velocity. However, the figures given are indicative of the problem.

Since the non-uniformities to be corrected are those which are generated at cruising speeds, the corrective honing of the tire must take place at the cruising speed for which the tire is being corrected, whether it be at 50, 60 or 90 miles per hour. Honing the tire at these high speeds requires extremely rapid movement of the honing device. For example, a standard size tire running at 60 miles per hour is revolving approximately 12 revolutions per second; and to cause the honing device to move into and out of contact with the tire once per revolution requires a system capable of movement on the order of 24 times per second (12 times in and 12 times out, or once per revolution). Valve systems have been developed which are capable of operating within the parameters noted, and may be utilized to effect the required movement of the honing device 29.

As the periphery of the tire is being honed, a second set of sensors 34 and 35 operatively connected to pillow blocks 13 and 14 supporting wheel axle 15, measure for the lack of symmetry in the tire. The sensors 34 and 35 also comprise piazoelectric crystals and they are mounted at right angles with respect to the sensors 26 and 27; that is, whereas the sensors 26 and 27 underlie and are effectively contacted by the opposite ends of axle 18 (through its pillow blocks) in a vertical plane, the sensors 34 and 35 are mounted on one side of the axle 15 and lie in a horizontal plane passing through the axis of rotation of the axle where they are effectively contacted by the opposite ends of the axle. In this position, the sensors 34 and 35 detect lack of symmetry (dynamic) on both sides of the tire, i.e., its right and left sides. It may be pointed out that tires are manufactured from strip stock and the lack of symmetry will vary within each side of the tire and often at different angular locations. It has been found that these vibrations occur in two planes, known as a "couple", and they produce both radial and lateral vibrations. The weights added to the inside of each tire sidewall in the area of the tire beads, i.e., to the bead itself or to adjacent portions of the sidewalls, will effectively correct for vibrations in each plane of the couple, it being remembered that the unsymmetrical forces vibrate at a fundamental frequency once per revolution of the tire irrespective of its velocity.

The force signals generated by the sensors 34 and 35 are also fed to the computer 26 where they are recorded and stored. This stored information is utilized to control the second stage corrective operation, which in the preferred embodiment comprises the honing of portions of rubber rings bonded to the inside of the tire in the area of beads. Thus, with reference to FIGS. 2 and 3, annular rings of rubber 36 and 37 are added to the inside surfaces of the conventional beads 38 and 39, respectively, of the tire 17. The beads of the tire are those portions which make contact with the rim of the wheel on which the tire is mounted; and in the case of tubeless tires, the beads are configured to make airtight contact with the wheel rim. The rubber rings 36 and 37 may be integrally molded as an incident of the manufacture of the tire, or they may comprise separately applied rings or strips of rubber vulcanized or otherwise permanently bonded to a conventional tire carcass.

The adding of weight in the form of rubber rings or strips to the insides of the tire beads or to the adjacent inside areas of the side walls in no way affects the charcteristics of the tire tread under dynamic operating conditions; that is, the added weight, being remote from the periphery of the tire, does not contribute to or alter the centrifugally induced non-uniformities inherent in the tire as manufactured. The added weights only affect tire symmetry, the weights when properly honed serving to effectively counterbalance the non-symmetrical forces present in the tire. It will be understood that initially the size and weight of the annular rings will be proportional to the size and weight of the tire; generally speaking, the larger and heavier the tire, the larger and heavier the rubber rings.

When the first stage honing operation is completed, the tire is preferably removed from the wheel 16 and transferred to a second corrective device where the second stage correcting operation is performed. However, before the tire is removed from the wheel 16, it is marked so that when positioned in the second corrective device and properly aligned, it will lie in the exact same relative position it occupied when mounted on the wheel 16, and consequently in its aligned position the tire will be calibrated with respect to the data stored in the computer relating to lack of symmetry as measured by the sensors 34 and 35.

The second stage corrective device, also shown in FIG. 1, comprises cradle 40 in which the tire 17 is seated, together with a honing device 41 mounted on a carriage 42 by means of which the honing device 41 is selectively moved into and out of contact with each of the rubber rings 36 and 37. The honing device 41 is moved into engagement with the rubber ring being honed by the carriage 42 under the direction of controller 43 which receives correcting signals from the computer 28 based on stored data relating to lack of tire symmetry. The cradle 40 is mounted for oscillatory movement relative to the honing device 41 and is oscillated by means of an oscillator 44 in accordance with corrective signals supplied by the computer 28 to the controller 45 which controls oscillating movement of cradle 40 through oscillator 44.

The tire 17 will be positioned in the cradle 40 with the mark applied to the tire prior to its removal from the wheel 16 in accurate registry with a reference point on the cradle, thereby positioning the tire in the same relative position it occupied when mounted on the wheel 16. The tire is thus indexed with respect to corrective signals from the computer 28 based on the data stored in the computer relating to the magnitude and location of the forces generated by lack of tire symmetry. Once the tire has been properly positioned in the cradle 40, the honing spindle 41 is moved to a position in which it will contact one of the rubber rings at the point of unbalance for the side of the tire on which the ring being honed is located. The point of unbalance will be determined by the computer in accordance with the data supplied by the sensors 34 and 35, the point of unbalance being the mean resultant point of the unsymmetrical forces measured by sensors 34 and 35. There will be two such points of unbalance, one for each side of the tire.

The honing device 41 will be brought into alignment with one of the points of unbalance by effecting relative movement between the carriage 42 mounting the honing device and the tire cradle. The honing device is then moved via its carriage 42 into honing engagement with the rubber ring. These movements are effected by the controller 43 in accordance with the corrective signals from the computer 28. The controller 43 will also control the depth to which the rubber ring is to be removed. Concurrently with the movement of the honing device 41 into honing engagement with the rubber ring, the cradle 40 will be oscillated equally about the resultant point of unbalance, the cradle moving back and forth by equal distances on opposite sides of the resultant point of unbalance, carrying the tire with it. The distance traversed by the cradle 40 and the tire 17 will be determined by the computer and controlled by the controller 45 which is operatively connected to oscillator 44. In this way each annular ring is honed to remove a portion of the ring in amounts and over an area to leave the proper amount of the ring to counterbalance the unsymmetrical forces on that side of the tire. When the honing of one of the rings is completed, the honing device will be shifted to the ring on the opposite side of the tire and honing operation repeated in accordance with the corrective signals supplied to the computer as to the location and magnitude of the unsymmetrical forces on the remaining side of the tire.

With reference to FIG. 4 which diagrammatically illustrates one side of the tire 17, the resultant point of unbalance is indicated by the point P, and the honing device is initially aligned to coincide with point P. The distance in either direction from point P in which the ring must be honed to remove the required amount of rubber is also determined by the computer in accordance with the stored data, and the computer acts through oscillator 44 to oscillate the tire in opposite directions from the point P to remove the required amount of rubber. In the example illustrated, rubber is removed from the ring throughout the areas A and B, which areas are effectively counterbalanced by the complimentary areas C and D on the opposite side of the ring. The remaining areas E and F and in balance and effectively cancel each other. It has been found that up to 45° removal of rubber on each side of the unbalanced point P is the most effective for counterbalancing. Beyond 45° in either direction from the point of unbalance the effect is negligible. It will be understood that the amount of rubber removed, both in terms of length of cut and depth, will be determined by the computer in accordance with the magnitude of the unsymmetrical forces encountered.

As an alternative to the honing of rubber rings or strips previously applied to the inside of the tire, strips of rubber of the required length and thickness may be bonded to the inside of the tire beads on the adjacent areas of the sidewalls as a part of the second stage corrective operation, the weight and location of such strips being determined by the computer from the stored data. In this case, the computer will be programmed to indicate the weight and location of the strips to be added, and the resultant points of unbalance may be marked on the tire in accordance with locations determined by the computer, whereupon the balancing strips will be applied in accordance with the marks. In the case of the example illustrated in FIG. 4, if corrective strips are to be added instead of effecting balancing by honing pre-applied rings, the resultant point of unbalance would be at the point P', which is diametrically opposite to the point P, and the strips would be added in the areas C and D, being centered at point P'.

As should now be apparent, the instant invention provides an integrated system for eliminating the vibrations generated in vehicular tires by correcting the tire both for peripheral non-uniformities and for lack of symmetry. The outside periphery of the tire is first honed in the radially protruding force generating areas, which are the areas that physically prevent the tire from maintaining a constant loaded radius as it moves along the highway at cruising speed. Once the tire has been corrected for these peripheral non-uniformities it is then corrected for lack of symmetry, which is accomplished by either honing portions of annular rubber rings or strips added to the inside of the tire in the areas of the tire beads, or by bonding separate strips of rubber to the insides of the tire in the areas of the beads at the location and in amounts sufficient to counterbalance the unsymmetrical forces. In either event, the outward appearance of the tire does not show that it has had weights added, but each tire once corrected is free from vibration producing forces when operated at its intended cruising speed.

It has been found that when a tire has been corrected in accordance with the present invention, the magnitude of vibration producing forces which may be generated at less than cruising speed, as when the vehicle is being operated at low or medium speeds, are of insufficient magnitude to be objectionable and lie well within acceptable parameters. The forces which pose the real problem are those encountered at cruising speed, and it is these forces which are corrected and reduced to an acceptable low level.

By utilizing the system and method of the present invention, the tire manufacturer may provide the customer with tires especially designed for use at predetermined cruising speeds, which in large measure will be governed by the laws limiting speed of vehicles operated on the highways.

Although a single preferred embodiment of a method and system has been described and illustrated, it is to be understood that modifications can be made without departing from the true spirit and scope of the invention. Numerous such modifications have already been set forth and others will undoubtedly occur to the worker in the art. For example, the specific nature of the honing devices does not constitute a limitation of the invention, the essential factor being the removal of the centrifugally generated peripheral non-uniformities and, in the case of the added rubber rings, the removal of sufficient portions of the rings to effectively counterbalance the tire for lack of symmetry. The programming of the computer to convert the measured force signals into corrective signals for the operation of the honing devices and oscillator is within the skill of the computer programmer, and numerous programs may be devised in accordance with the desired parameters for corrective action. It also will be evident that the device which hones the annular rubber rings may be oscillated relative to the tire rather than oscillating the tire cradle or other tire support. Accordingly, it is not intended that the invention be limited other than in the manner set forth in the claims which follow.

The embodiments of the invention in which an exclusive property or privilege is claimed are defined as follows:

1. A method of correcting a rubber tire for vibration producing forces generated in the tire when operated under load and at cruising speed, which comprises the steps of:

revolving the tire at a cruising speed equal to from 50–90 m.p.h. under a load simulating the weight load supported by the tire in normal use to develop centrifugally generated forces in the tire, measuring the magnitudes and locations of the centrifugally generated forces developed in the revolving tire, said measured forces comprising (a) forces generated by peripheral non-uniformities, and (b) forces developed by lack of tire symmetry, and correcting the tire for both the (a) and (b) forces in two stages, the first stage comprising correction for the (a) forces by removing rubber from the periphery of the tire in accordance with the magnitude and location of the non-uniformities while the tire is rotating at cruising speed, and the second stage comprising correction for the (b) forces by selectively adding to or removing rubber from the tire in the areas at or adjacent the tire beads in accordance with the magnitude and location of the (b) forces.

2. The method claimed in claim 1 including the step of removing rubber from the periphery of the tire in the areas of the non-uniformities while the tire is revolving at cruising speed, whereby to reduce the magnitude of the non-uniformities and hence the magnitude of the generated (a) forces.

3. The method of claim 2 wherein rubber is removed from the periphery of the tire by honing the tire with a honing device.

4. A method claimed in claim 3 including the step of moving the honing device into and out of contact with the periphery of the tire in timed relation to the rotation of the tire, and contacting the periphery of the tire only in the areas of the non-uniformities.

5. The method claimed in claim 4 wherein the honing device is moved into and out of contact with the periphery of the tire once during each revolution of the tire.

6. The method claimed in claim 1 including the step of adding an annular ring of rubber to the inside of the tire in the area of each tire bead prior to the steps of developing and measuring the centrifugally generated forces, and wherein the (b) forces resulting from lack of tire symmetry are reduced by removing portions of the added rubber rings.

7. The method claimed in claim 6 wherein the portions of the annular rubber rings are removed by honing the rubber rings with a honing device.

8. The method claimed in claim 7 including the step of effecting relative oscillatory movement between the tire and said honing device, whereby to effect honing of the rubber rings throughout the extent of relative oscillatory movement.

9. the method claimed in claim 8 including the step of locating the point of mean unbalance for each side of the tire, and effecting honing of the rubber rings in accordance with the mean point of unbalance for the side of the tire with which each rubber ring is associated, the mean points of unbalance each serving as the midpoint for effecting relative oscillatory movement between the tire and the honing device.

10. The method claimed in claim 6 wherein the (b) forces developed by lack of tire symmetry are reduced by bonding strips of rubber to the inside of the tire in the area of each tire bead.

11. The method claimed in claim 10 including the step of locating the point of mean unbalance for each side of the tire, and bonding the strips of rubber to the inside of the tire at points diametrically opposite to the said points of mean unbalance, said diametrically opposite points serving as the midpoints for the added strips of rubber.

12. The method claimed in claim 1 including the step of measuring the magnitude and location of the (b) forces as the tire is being corrected for the (a) forces, and correcting for the (b) forces in accordance with the resultant (b) force measurements following correction for the (a) forces.

13. The method claimed in claim 9 wherein said relative oscillating movement is no greater than 45° on either side of a mean point of unbalance.

14. In a system for correcting a rubber tire for vibration producing forces in two stages, means for revolving the tire at a cruising speed of from 50–90 m.p.h. under a load simulting the weight load supported by the tire when in use, sensing means for measuring the magnitude and location of the centrifugally generated forces developed in the tire, said sensing means comprising a first set of sensors for measuring the forces generated by peripheral non-uniformities in the tire and a second set of sensors for measuring the forces generated by lack of tire symmetry, computer means responsive to said sets of sensing means for generating corrective signals in accordance with the magnitude and location of the measured forces, a first stage correction means comprising a first honing means positioned to be moved into and out of engagement with the periphery of the tire while it is being revolved by said revolving means, and actuating means for said first honing means responsive to the corrective signals generated by said computer means for moving said first honing means into and out of honing engagement with the periphery of the tire, said actuating means being responsive to the corrective signals generated by said computer means in accordance with the magnitude and location of forces generated by peripheral non-uniformites in the tire, a second stage correction means comprising a cradle for receiving and positioning the tire upon removal from said tire revolving means in the same relative position it occupied when mounted on said tire revolving means, a second honing means adapted to be moved into and out of engagement with the inner surfaces of the tire in the areas of the tire beads when the tire is positioned in said cradle, and actuating means for moving said second honing device into and out of honing engagement with the inner surface of the tire, said last named actuating means being responsive to the corrective signals generated by said computer means in accordance with the magnitude and location of the forces generated by lack of symmetry.

15. The system claimed in claim 14 including oscillating means for oscillating said cradle, and controller means responsive to the corrective signals generated by said computer means for actuating said oscillating means.

16. The tire correcting system claimed in claim 14 wherein the means for revolving a tire at cruising speed and under load comprises a supporting frame, a road-simulating drum rotatably mounted on said frame, a test wheel for the tire being corrected rotatably mounted on said frame in spaced relation to said drum with its axis of rotation parallel to and in vertical alignment with the axis of rotation of said drum, means for varying the distance between the axis of said drum and said wheel to bring the drum into contact with the tire and simulate the weight load carried by the tire when in use, and drive means for revolving the drum at cruising speeds, and wherein said first set of sensors is positioned on opposite sides of said drum in locations to sense and measure the forces generated by peripheral non-uniformities in the tire in its area of contact with the drum, said second set of sensors being positioned on opposite sides of said wheel in locations to sense and measure the unbalanced forces generated by lack of tire symmetry.

17. The tire correcting system claimed in claim 16 wherein said first set of sensors lies beneath the axis of rotation of said drum and is responsive to force variations in a vertical plane passing through the axis of rotation of said drum, and wherein said second set of sensors lies on one side of the axis of rotation of said wheel and is responsive to force variations in a horizontal plane passing through the axis of rotation of said wheel.

18. The tire correcting system claimed in claim 17 wherein said sensors each comprises a piezoelectric quartz crystal.

19. The tire correcting system claimed in claim 18 wherein said road-simulating drum is mounted on an axle, and wherein the means for varying the distance between the axes of said drum and said wheel comprises a pair of lifting means operatively connected to the opposite ends of said axle, said lifting means being movable in unison to maintain the parallel relationship between the axis of rotation of said drum and the axis of rotation of said wheel.

* * * * *